United States Patent [19]

Parente

[11] Patent Number: 4,850,093
[45] Date of Patent: Jul. 25, 1989

[54] METHOD OF MAKING AN ACOUSTIC ATTENUATING LINER

[75] Inventor: Charles A. Parente, Oyster Bay, N.Y.

[73] Assignee: Grumman Aerospace Corporation, Bethpage, N.Y.

[21] Appl. No.: 186,676

[22] Filed: Apr. 21, 1988

Related U.S. Application Data

[63] Continuation of Ser. No. 12,616, Feb. 9, 1987, abandoned.

[51] Int. Cl.⁴ .............................................. B21D 39/03
[52] U.S. Cl. ........................................ 29/428; 29/558
[58] Field of Search ....................... 29/428, 557, 558; 181/286, 292, 293, 294; 219/121.7, 121.71

[56] References Cited

U.S. PATENT DOCUMENTS

| | | | |
|---|---|---|---|
| 2,900,713 | 8/1959 | Young | 228/173.1 |
| 3,030,703 | 4/1962 | Wirsing, Jr. | 228/181 |
| 3,166,149 | 1/1965 | Hulse et al. | 181/292 |
| 3,226,527 | 12/1965 | Harding | 219/121 LK X |
| 3,373,480 | 3/1968 | Fuchs, Jr. | 228/157 |
| 3,542,152 | 11/1970 | Adamson et al. | 181/214 |
| 3,617,683 | 11/1971 | Beresford et al. | 219/121 LK |
| 3,640,357 | 2/1972 | Kitching et al. | 181/292 |
| 3,821,999 | 7/1974 | Guess et al. | 181/296 |
| 3,948,346 | 4/1976 | Schindler | 181/286 |
| 4,001,473 | 1/1977 | Cook | 428/116 |
| 4,032,743 | 6/1977 | Erbach et al. | 219/121 LK |
| 4,054,477 | 10/1977 | Curran | 156/197 |
| 4,131,782 | 12/1978 | Einstein et al. | 219/121 LL |
| 4,257,998 | 3/1981 | Diepenbrock, Jr. et al. | 264/156 |
| 4,288,679 | 9/1981 | La Rocca | 219/121.71 |
| 4,291,080 | 9/1981 | Ely et al. | 181/292 X |
| 4,384,020 | 5/1983 | Beggs et al. | 181/292 X |
| 4,433,021 | 2/1984 | Riel | 428/116 |
| 4,458,134 | 7/1984 | Ogle | 219/121.7 |
| 4,608,480 | 8/1986 | Bizot et al. | 219/121 LK |

FOREIGN PATENT DOCUMENTS 219454  5/1958  Australia ............................ 181/286

Primary Examiner—Howard N. Goldberg
Assistant Examiner—Andrew E. Rawlins
Attorney, Agent, or Firm—Richard G. Geib; Daniel J. Tick; Bernard S. Hoffman

[57] ABSTRACT

A titanium face plate is perforated by laser drilling holes therethrough. A cellular core is positioned between a sound reflecting solid back plate and the face plate.

3 Claims, 1 Drawing Sheet

METHOD OF MAKING AN ACOUSTIC ATTENUATING LINER

This is a continuation of copending application Ser. No. 12,616, filed Feb. 9, 1987, now abandoned.

BACKGROUND OF THE INVENTION

The present invention relates to acoustic attenuating liners. More particularly, the invention relates to a method of making an acoustic attenuating liner.

Acoustic attenuating liners are widely used for attenuating noise produced by the jet engines of aircraft. It is well known in the art to make an acoustic attenuating liner or panel having a sound reflecting solid back plate, a perforated metal face plate and a honeycomb or cellular core between such plates to partition the air into a multiplicity of separate cells. However, the acoustic attenuating liners are deficient for certain applications, due to inadequacies of the face plate. Thus, the metals used in the construction of these liners are prone to corrosion, thereby resulting in the loss of effectiveness and the need for periodic replacement. Furthermore, the holes formed through the face plate may be too large in diameter and/or spaced too far from each other for effective sound attenuation.

The principal object of the invention is to provide a method of manufacturing a new and improved acoustic attenuating liner.

An object of the invention is to provide a method of manufacture of a face plate of an acoustic attenuating liner, which face plate is corrosion-proof and has a desired or specified porosity.

Another object of the invention is to provide a method of making a face plate of an acoustic attenuating liner, which consists of laser drilling holes through said plate whereby the diameter of the holes and the spacing between next-adjacent holes may be made as small as desired thereby to meet the specific flow resistances.

BRIEF SUMMARY OF THE INVENTION

In accordance with the invention, a method of making an acoustic attenuating liner comprises the steps of forming a perforated metal face plate and positioning a cellular core between a sound reflecting solid back plate and the perforated plate.

The face plate is perforated by laser drilling holes therethrough and is preferably a titanium plate.

Each of the face and back plates consists of a thin sheet.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

Figure 1:
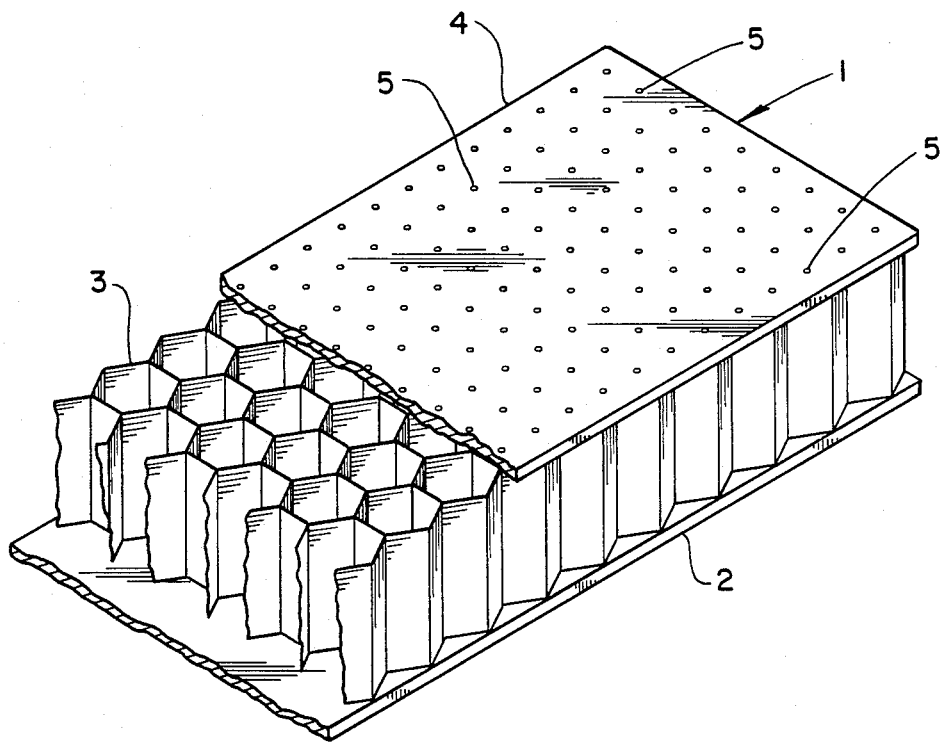
FIG. 1 is a perspective view, partly cut away and partly in section, of an embodiment of an acoustic attenuating liner made by the method of the present invention.
Figure 2:
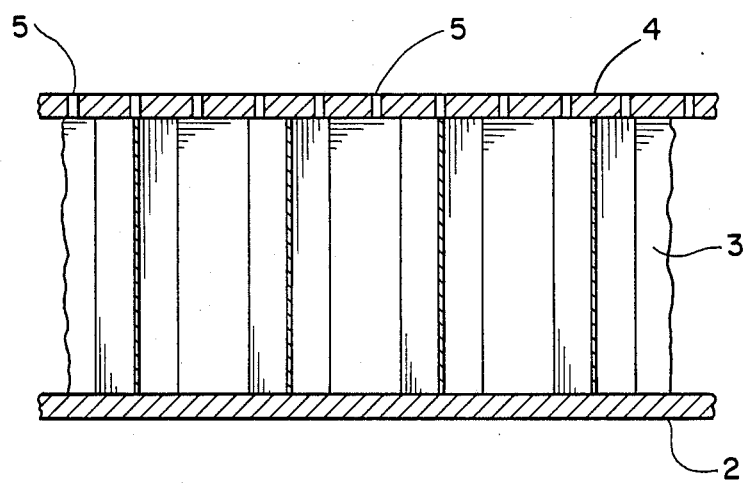
FIG. 2 is a vertical sectional view, on an enlarged scale, of the embodiment of FIG. 1.

In the embodiment of FIGS. 1 and 2, an acoustic attenuating liner or panel 1 comprises a hard-surfaced, substantially air impervious, sound reflecting solid back plate 2. The back plate 2 is the most distant layer from the source of sound waves to be damped. The back plate 2 is a thin sheet, but provides a high backing impedance and structural rigidity. The back plate 2 may comprise aluminum, titanium, fiberglass or graphite epoxy.

The plate 2 is bonded to a honeycomb or cellular core 3. The thickness of the honeycomb core 3, having individual cells extending throughout the thickness, serves structurally to separate the back plate 2 from a face plate 4. The thickness of the honeycomb core 3 is also acoustically critical, since it determines the impedance of the air layer as well as the frequency range of sound absorption. Depending upon the use of the liner 1, the honeycomb core 3 material may be paper, metal, such as, for example, aluminum, titanium or Nomex, fiberglass, or any other suitable structural material.

The perforated metal face plate 4 is bonded to the cellular core 3 at the opposite end from the back plate 2. The face plate 4 is preferably titanium, to prevent corrosion, and consists of a thin sheet. In accordance with the invention, the titanium face plate 4 is perforated by laser drilling holes or perforations 5 therethrough. The holes 5 function as a fluid communication between the honeycomb core cells and the external medium. The face plate 4 has a hard surface which may be readily cleaned and maintained.

Effective sound absorption was provided when the holes 5 were uniformly distributed over the plate 4 and constituted 3 to 6% of the total area of said plate. The porosity of the face plate 4 may be designed to meet specific flow resistances by either changing the hole size or the spacing between holes, or by simultaneously changing both. The smooth side of the face plate 4 is exposed to the air stream and the exit side is bonded to the core 3.

The laser drilling permits the completion of holes of much smaller diameter than those produced by other drilling methods and permtis considerably smaller spacing between next-adjacent holes than that accomplished by other methods. Thus, a suitable acoustic attenuating liner would have a face plate, made by the method of the invention, with a hole diameter of 0.002 to 0.003 inch, hole spacing of 0.008 to 0.016 inch, 11,000 to 16,000 holes per square inch and 3 to 6% open area.

U.S. Pat. No. 2,900,713 to Young discloses a honeycomb structure having metal face and back plates and U.S. Pat. No. 3,030,703 to Wirsing, Jr. discloses a honeycomb structure made of stainless steel, nickel alloys, titanium or titanium alloys. U.S. Pat. Nos. 3,166,149 to Hulse et al, 3,542,152 to Adamson et al, 3,640,357 to Kitching et al, 3,821,999 to Guess et al, 4,257,998 to Diepenbrock, Jr. et al and 4,433,021 to Riel disclose acoustic attenuating liners having honeycomb cores and metal face and back plates. U.S. Pat. No. 3,373,480 to Fuchs, Jr. discloses a honeycomb structure having titanium face and back plates. U.S. Pat. No. 4,001,473 to Cook discloses a sound attenuating honeycomb structure having face and back sheets of aluminum, stainless steel, iron or titanium. U.S. Pat. No. 4,054,477 to Curran discloses a metal honeycomb core panel structure.

Laser drilling methods are disclosed in U.S. Pat. Nos. 4,288,679 to La Rocca and 4,458,134 to Ogle.

Although shown and described what is believed to be the most practical and preferred embodiment, it is apparent that departures from the specific method and design described and shown will suggest themselves to those skilled in the art and may be made without departing from the spirit and scope of the invention. I, therefore, do not wish to restrict myself to the particular construction described and illustrated, but desire to avail myself of all modifications that may fall within the scope of the appended claims.

What is claimed is:

1. A method of making an acoustic attenuating liner, comprising the steps of perforating a metal face plate by laser drilling 11,000 to 16,000 holes per square inch therethrough thereby providing a predetermined number of holes of predetermined diameter spaced at predetermined intervals from each other for assisting in providing desired acoustic attenuation; and positioning a cellular core between a sound reflecting solid back plate and said face plate, said cellular core having a plurality of cells and said face plate having said laser drilled holes aligned with each of said cells thereby enhancing the characteristics of the acoustic attenuation.

2. A method as claimed in claim 1, wherein each of said face and back plates consists of a thin sheet.

3. A method as claimed in claim 1, wherein said face plate comprises titanium.

* * * * *